United States Patent [19]

Okaji

[11] Patent Number: 4,836,678
[45] Date of Patent: Jun. 6, 1989

[54] DOUBLE-PATH INTERFEROMETER

[75] Inventor: Masahiro Okaji, Ibaraki, Japan

[73] Assignee: Agency of Industrial Science & Technology, Ministry of International Trade & Industry, Tokyo, Japan

[21] Appl. No.: 30,349

[22] Filed: Mar. 26, 1987

[30] Foreign Application Priority Data

Mar. 26, 1986 [JP] Japan ................................. 61-68057

[51] Int. Cl.$^4$ ................................................ G01B 9/02
[52] U.S. Cl. .................................... 356/351; 356/358; 356/363
[58] Field of Search ....................... 356/349, 351, 363

[56] References Cited

U.S. PATENT DOCUMENTS 3,790,284 2/1974 Baldwin .............................. 356/349
4,787,747 11/1988 Sommargren ...................... 356/349

Primary Examiner—Vincent P. McGraw
Assistant Examiner—S. A. Turner
Attorney, Agent, or Firm—Oblon, Fisher, Spivak, McClelland & Maier

[57] ABSTRACT

A double-path interferometer comprises first and second polarized beam splitters disposed side by side on a light path from a light source, a half-wave plate interposed between the first and second polarized beam splitters, a cube corner prism, a reflecting mechanism disposed on the light path of the cube corner prism ahead of the two splitters, and a quarter-wave plate for causing a 90-degree rotation of the polarization plane in forward and backward light paths with respect to the reflecting mechanism.

6 Claims, 5 Drawing Sheets

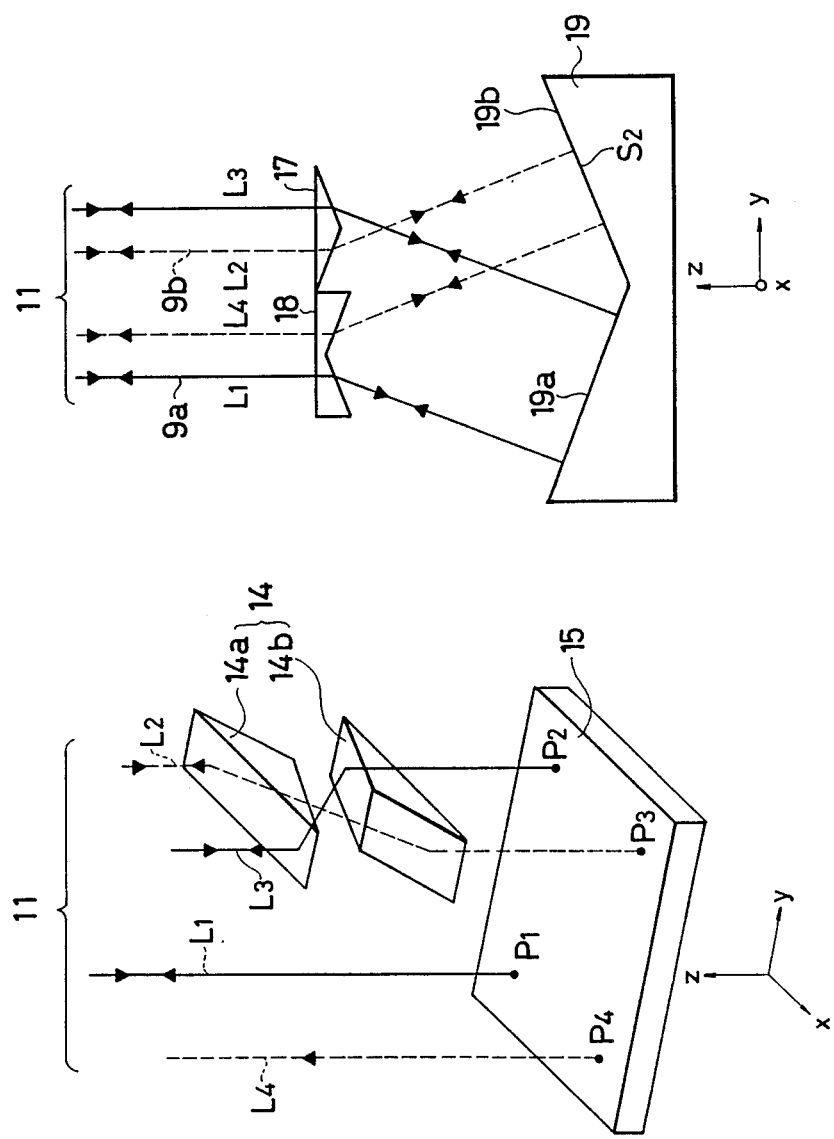

DOUBLE-PATH INTERFEROMETER

BACKGROUND OF THE INVENTION

Field Of The Invention

This invention relates to a double-path interferometer.

DISCUSSION OF THE BACKGROUND

In order to obtain high straightness of motion of precision mechanism parts, orientation control of the parts is indispensable. As a prior art method of measuring six freedom degrees of motion, there is one in which the translational and rolling, yawing or rocking components of the motion are obtained in three directions. In this method, it is necessary to take three spacially spaced-apart points. However, unless the time-wise stability of the positional relation among these reference points is guaranteed, high overall precision cannot be ensured even though very high precision of measurement of each component of motion may be obtained. To overcome this defficiency and obtain further increase of the precision of the measurement, it is necessary to develop a measurement system which has only a single reference point. To this end, it is essential to measure all six freedom degrees of motion with respect to one direction. However, there is no measuring method having performance satisfying this requirement among the heretofore developed methods using interferometers or autocollimators.

The inventor has proposed a double-path interferometer (J. Phys. E: Sci. Instrum., Vol. 17, 1984), which can accurately measure the translational component of motion of an object in the direction of the motion. In this interferometer, however, it has been impossible to obtain measurement of a component of motion other than the translational component, e.g., rolling, pitching and yawing components.

SUMMARY OF THE INVENTION

This invention was made in view of the above, and its object is to provide an interferometer which permits measurement of the individual components of six freedom of degrees of motion separately from one another with respect to the direction of motion.

To attain the above object of the invention, there is provided an interferometer which comprises first and second polarized beam splitters disposed side by side on a light path from a light source, a half-wave plate interposed between the first and second polarized beam splitters, a cube corner prism, reflecting means disposed on the light path of the cube corner prism ahead of the two means splitters, and quarter-wave plate for causing a 90-degree rotation of the polarization plane in forward and backward light paths with respect to the reflecting means.

For the measurement of the rolling component the reflecting means consists of a reflecting mirror having two inclined reflecting surfaces and a biprism. For the measurement of the yawing and pitching components, the reflecting means consists of two biprisms and a plane surface mirror. For the measurement of the translational component perpendicular to the direction of the motion, the reflecting means consists of two biprisms and reflecting mirror having two inclined reflecting surfaces.

With the above construction, the three translational components of motion of an object in directions the same as and perpendicular to the direction of the motion and rotational components with respect to the three axes can be measured perfectly separately from one another from the direction of the motion. Thus, the six freedom of degrees can be readily measured with a single reference point.

The above and other objects and features of the invention will become more apparent from the following detailed description with reference to the accompanying drawings.

BRIEF DESCRIPTION OF THE DRAWINGS

FIG. 5 is a perspective view showing an essential part of the interferometer for the measurement of the pitching and rolling components according to the invention;

FIG. 6 is a front view showing an essential part of the interferometer for the measurement of the perpendicular translational component of motion according to the invention;

DESCRIPTION OF THE PREFERRED EMBODIMENTS

Figure 1:
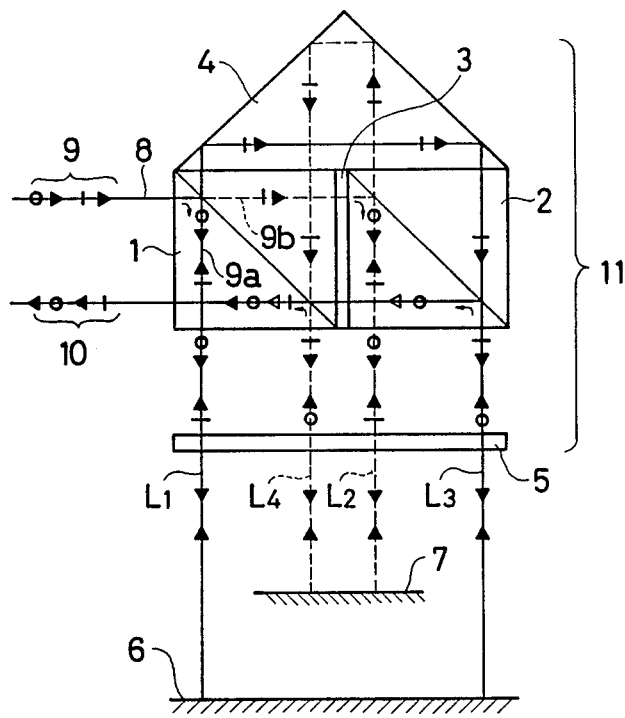
FIG. 1 is a schematic view showing a well-known interferometer for the measurement of a translational component of a motion in the direction thereof.

FIG. 1 schematically shows a well-known interferometer for measuring the translational component of motion, which has been proposed earlier by the inventor. This interferometer comprises first and second polarized beam splitters which are disposed side by side along an incident light path 8, a half-wave plate 3 interposed between the first and second beam splitters 1 and 2, a cube corner prism 4 disposed to provide a perpendicular light path with respect to the two polarized beam splitters, a quarter-wave plate 5 disposed on the light path of the cube corner prism 4 beyond the two beam splitters, a first reflecting mirror 6 disposed on the light path of the quarter-wave plate 5 for reflecting the light beam from the first polarized beam splitter 1 and a second reflecting mirror 7 for reflecting the light beam from the second polarized beam splitter 2.

A laser is used as a light source. When an incident light beam having a 45° linear polarization and proceeding along the light path 8 is incident on the first polarized beam splitter 1, it is transmitted through the polarization plane parallel to the plane of the drawing sheet (marked by an arrow with a bar), while it is reflected and refracted by 90° by the polarization plane perpendicular to the plane of the drawing sheet (marked by an arrow with a trailing circle).

The light beam 9b which has been transmitted through the first beam splitter 1 (hereinafter referred to as "transmitted light beam" and shown by a dashed line) passes through the half-wave plate 3. At this time, the polarization plane is rotated by 90° to become perpendicular. Thus, in the second polarized beam splitter 2 the light beam is reflected and refracted by 90°. This transmitted light beam proceeds along a light path $L_2$ to be reflected by the second reflecting mirror 7. The light beam is transmitted twice, i.e., forwardly and backwardly, by the quarter wave plate. The polarization plane thus is rotated by 90° to become perpendicular to the plane of the drawing sheet. Thus, the transmitted light beam having been reflected by the second reflecting mirror 7 is transmitted again through the quarter-wave plate 5, whereby the polarization plane becomes parallel. The light beam thus is transmitted through the second polarized beam splitter 2, and the direction of its progress is inverted 180° by the cube corner prism 4. The light beam then passes through the first polarized beam splitter 1. The transmitted light beam proceeds along a light path $L_4$ to be led to and reflected by the second reflecting mirror 7. The transmitted light beam reflected by the second reflecting mirror 7 is transmitted again through the quarter-wave plate 5. The light beam is transmitted twice, i.e., forwardly and backwardly, by the quarter wave plate. The polarization plane thus is rotated by 90° to become perpendicular to the plane of the drawing sheet. Thus, it is reflected and refracted by 90° by the first polarized beam splitter 1 to be led to a light detector (not shown).

The light beam 9a having been reflected by the first polarized beam splitter 1 and having a perpendicular polarization plane (hereinafter referred to as "reflected light beam" and shown by a solid line) is also transmitted through the quarter-wave plate 5. This reflected light beam proceeds along a light path $L_1$ to be led perpendicularly to and reflected by the first reflecting mirror 6. The light beam then is transmitted through the quarter-wave plate 5, whereby the polarization plane is rotated by 90°. The light beam then passes through the first beam splitter 1, and the direction of its progress is then inverted 180° by the cube corner prism 4. The light beam is then transmitted through the second polarized beam splitter 2. The light beam then proceeds along a light path $L_3$ to return to the second beam splitter 2 after being reflected by the first reflecting mirror 6. At this time, the light beam is transmitted twice, i.e., forwardly and backwardly, by the quarter-wave plate 5. The polarization plane thus is rotated by 90° to become perpendicular to the plane of the drawing sheet. The light beam is thus reflected by the second polarization beam splitter 2 and passes through the halfwave plate 5 before reaching the first polarized beam splitter. The polarization plane is thus rotated by 90°, and the light beam is transmitted through the first polarized beam splitter 1. The thus reflected light beam 10 is led together with the transmitted light beam having been bent by the first polarized beam splitter 1 to an external light detector (not shown).

In the measurement of the translational component of the direction of motion with the interferometer having the above construction, the first (or second) reflecting mirror is used as a measurement object, and the second (or first) reflecting mirror as reference. In this case, the translational component of the direction of motion of the object can be observed from changes in the interference fringes formed by the reflected and transmitted light beams accompanying changes in the length of the transmitted light beam paths $L_2$ and $L_4$ or length of the reflected light paths $L_1$ and $L_3$.

In this interferometer, the light path is doubled by the cube corner prism, so that the measurement sensitivity is doubled.

Now, the measurement of the rolling component of motion will be described in conjunction with an interferometer shown in FIGS. 2 to 4.

In this interferometer, the arrangement of first and second polarized beam splitters 1 and 2, half-wave plate 3, cube corner prism 4 and quarter-wave plate 5 is entirely the same as in the interferometer shown in FIG. 1 (this portion being hereinafter referred to as "basic portion 11" of the interferometer).

On the light path beneath the quarter-wave plate 5, there are disposed, as light path conversion elements, a biprism 12 and a reflecting mirror 13, the latter of which has two plane surfaces 13a and 13b having an equal inclination angle with respect to a horizontal plane. The biprism 12 distributes the light beam having been transmitted through the quarter-wave plate 5 to be incident perpendicularly on the inclined plane surfaces at predetermined points thereof.

Figure 4:
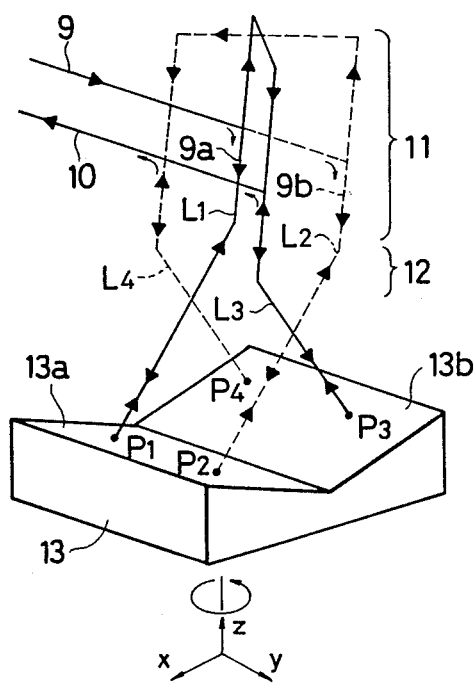
FIG. 4 is a view for explaining the light paths of the interferometer shown in FIG. 2.

FIG. 4 shows the details of the light paths of the interferometer having the above construction.

Incident light beam 9 is incident on the surface of the first polarized beam splitter 1 right above the inclined plane surface 13b of the reflecting mirror 13. The light beam 9b in the incident light beam having a polarization plane parallel to the plane of the drawing sheet, as in the case of the interferometer shown in FIG. 1, is transmitted through the first beam splitter 1 and reflected by the second polarized beam splitter 2 to be led to the quarter-wave plate 5. The light beam 9b which has a perpendicular polarization plane to the plane of drawing sheet is reflected by the first polarized beam splitter 1 to be led to the quarter-wave plate 5. The transmitted light beam from the quarter-wave plate 5 is bent sideways as it is transmitted through the biprism 12. The light beam then proceeds along the light path $L_2$ to be perpendicularly incident on and reflected by the inclined plane surface 13a of the reflecting mirror 13 at a point $P_2$. This transmitted light beam is transmitted through the polarized beam splitter 2, and the direction of its progress is inverted by 180° by the cube corner prism 4. Also, its position is shifted to be right above the inclined plane surface 13a. The light beam is then transmitted through the first polarized beam splitter 1 and quarter-wave plate 5. Then it is bent sidewise by the biprism 12 to proceed along the light path $L_4$ and perpendicularly incident on and reflected by the inclined plane surface 13b of the reflecting mirror 13 at a point $P_4$. As this reflected transmitted light beam passes through the quarter-wave plate 5 twice, i.e., forwardly and backwardly, the polarization plane is rotated by 90°. The light beam thus is reflected by the first polarized beam splitter 1 to be led to a light detector (not shown).

Meanwhile, as the reflected light beam 9a having been transmitted through the quarter-wave plate 5 is transmitted through the biprism 12, it is bent sidewise to proceed along the light path $L_1$ and be perpendicularly incident on and reflected by the inclined plane surface 13a of the reflecting mirror 13 at a point $P_1$. This reflected light beam is returned along the same light path as the forward path. Further, it is transmitted through the polarized beam splitter 1, and the direction of its progress is inverted by 180° by the cube corner prism 4 while also its position is shifted to be right above the inclined plane surface 13a. The light beam then passes the second polarized beam splitter 2 and quarter-wave plate 5 and is then bent sideways by the biprism 12 to proceed along a light path $L_3$ and fall perpendicularly on and be reflected by the inclined plane surface 13b of the reflecting mirror 13 at a point $P_3$. This reflected transmitted light beam is reflected by the second polarized beam splitter 2 to be led together with the transmitted light beam having been reflected by the first polarized beam splitter 1 to the light detector for interference.

Figure 2:
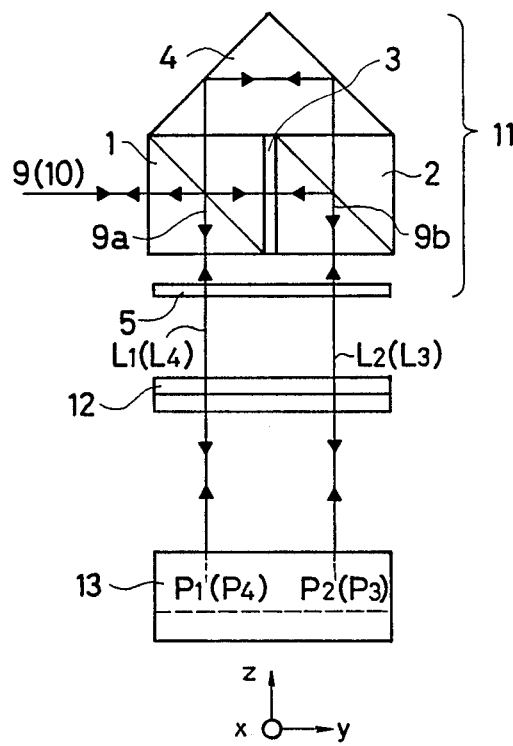
FIG. 2 is a schematic front view showing an interferometer for the measurement of the rolling component according to the invention.
Figure 3:
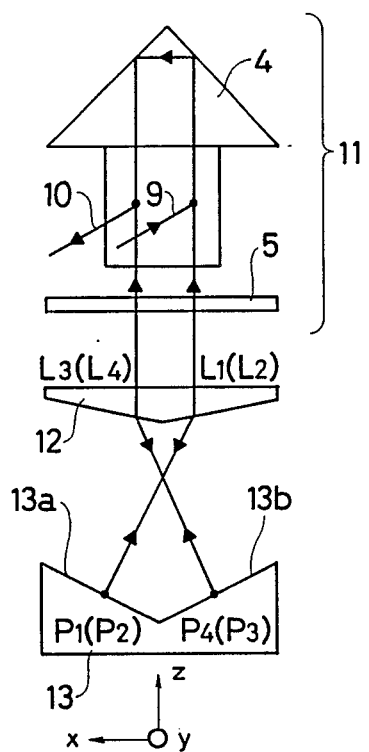
FIG. 3 is a side view showing the interferometer shown in FIG. 2.

By taking the coordinate system of the reflecting mirror as shown in FIGS. 2 to 4 and causing rotation of the reflecting mirror about the center thereof in the counterclockwise direction, the lengths of the light paths $L_1$ and $L_3$ are increased while the lengths of the light paths $L_2$ and $L_4$ are reduced. Thus, the interference fringes observed on the light detector repeatedly become bright and dark according to the changing rotational angle.

As has been shown, the above interferometer permits detection of the rotational component (i.e., rolling component) of motion about the z-axis through observation in the z-axis direction. when the reflecting mirror 13 is rotated counterclockwise with respect to the x- or y-axis, the lengths of the light paths $L_1$ and $L_4$ (light paths $L_1$ and $L_2$ in case of the y-axis) are increased, while the lengths of the light paths $L_2$ and $L_3$ (light paths $L_3$ and $L_4$ in case of the y-axis) are reduced. Further, when the reflecting mirror 13 is displaced along the x-axis in the positive direction, the lengths of the light paths $L_1$ and $L_2$ are increased, while the lengths of the light paths $L_3$ and $L_4$ are reduced. With a displacement in the y-axis directions, the length of each light path remains unchanged. With a displacement in the z-axis directions, the length of each light path is increased or reduced to an equal extent. Theoretically, therefore, the sensitivity of the interferometer is zero with respect to a given translational component and rotational (i.e., pitching and yawing) components with respect to the x- and y-axes, and only the rolling component can be detected.

Now, the measurement of the yawing and pitching components will be described with reference to FIG. 5. Referring to the Figure, the construction of the basic portion of the interferometer is the same as the basic portion of the interferometer shown in FIGS. 2 and 3, so that it is not described any further. A light path conversion element 14, which consists of a combination of two biprisms 14a and 14b in this embodiment, is disposed on the light paths $L_2$ and $L_3$ so that the light beams passing through the light paths $L_2$ and $L_3$ of the four light paths $L_1$, $L_2$, $L_3$ and $L_4$ on the quarter-wave plate are incident on the reflecting mirror 15 respectively at the points $P_3$ and $P_2$. Further, a plane surface mirror is used as the reflecting mirror 15.

In the interferometer having the above construction, when the reflecting mirror 15 is rotated with respect to the y-axis in the counterclockwise direction, the lengths of the light paths $L_1$ and $L_3$ are reduced, while the lengths of the light paths $L_2$ and $L_4$ are increased. Thus, the yawing component can be detected through observation in the z-axis direction.

When the reflecting mirror 15 is rotated with respect to the x-axis in the counterclockwise direction, the lengths of the light paths $L_1$ and $L_4$ are increased while the lengths of the light paths $L_2$ and $L_3$ are reduced. Therefore, the sum of the lengths of the light paths of the interferometer remain unchanged. With the translational components in the x- and y-axis directions and rolling component with respect to the z-axis of the reflecting mirror 15, the length of each light path remains unchanged. With respect to a displacement of the mirror in the z-axis directions, the lengths of the individual light paths are increased or reduced to an equal extent. Thus, for a given translational component and rotational (i.e., pitching and rolling) components with respect to the x- and z-axes, the sensitivity of the interferometer is zero, so that only the yawing component can be measured.

For the measurement of the pitching component with respect to the x-axis, the pitching component alone can be measured according to the same principles as the measurement of the yawing component by interchanging the light paths $L_3$ and $L_4$ in the arrangement of the rolling component measurement and interchanging the light incidence points of the light paths $L_3$ and $L_4$ on the reflecting mirror 15.

Now, the measurement of the translational component perpendicular to the direction of motion will be described with reference to FIG. 6. A reflecting mirror 19 having the same construction as the reflecting mirror having the two inclined plane surfaces as used in the rolling component measurement is disposed beneath the quarter-wave plate 5. Biprisms 17 and 18 are arranged as light path conversion elements in the light paths between the quarter-wave plate 5 and reflecting mirror 19 such that only the reflected light beam 9a, i.e., the light beam along the light paths $L_1$ and $L_3$, in the incident light beam is perpendicularly incident on the inclined plane surface 19a of the reflecting mirror 19 and that only the transmitted light beam 9b, i.e., the light beam along the light paths $L_2$ and $L_4$, in the incident light beam, is perpendicularly incident on the inclined plane surface 19b.

When the reflecting mirror 19 is moved along the y-axis in the positive direction thereof, the lengths of the light paths $L_1$ and $L_3$ are reduced while the lengths of the light paths $L_2$ and $L_4$ are increased. Thus, the component of motion can be measured from the changes in the interference fringes. Further, the yawing component of motion of the reflecting mirror 19 can be measured from changes in the lengths of the individual light paths. For the other components of motion than described above, the interferometer provides zero sensitivity. Since the method of measuring the yawing component has already been described above, even where a yawing component is mixed with the translational component in the x-axis direction, it is possible to accurately measure only the translational component in the x-axis direction from the difference between the two measurements. The translational component in the x-axis direction can be obtained through measurement by rotating the arrangement of the light paths $L_1$, $L_2$, $L_3$ and $L_4$ by 90° by using, for example, the Dove prism (not shown).

Figure 7:
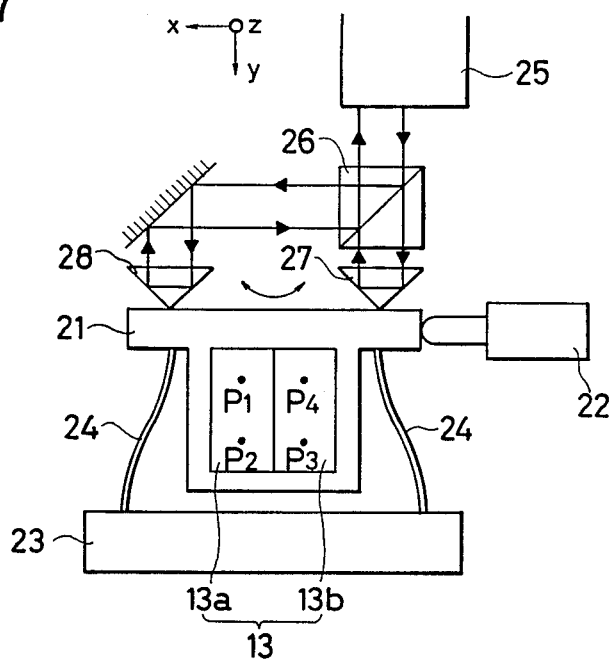
FIG. 7 is a schematic view showing a combination of the interferometer according to the invention and a calibration interferometer.

FIG. 7 shows an arrangement in which the reflecting mirror 13 of the interferometer for the rolling component measurement as shown in FIGS. 2 to 4 are supported perpendicularly on a rotating table 21 supported by a pair of leaf springs 24 secured at one end to a base plate 23. An interferometer body (not shown) is disposed at a position corresponding to the reflecting mirror. The rotating table 21 is adapted to be given a predetermined rotation by a micrometer 22. Two cube corners prisms 27 and 28 are provided on the rotating table. The beam from a laser 25 is split by a polarized beam splitter 26 into beams having polarization planes parallel and perpendicular to the plane of the drawing sheet, respectively. By causing interference of two reflected beams from the two cube corner prisms 27 and 28, it is possible to obtain the relative displacement of the two prisms. The rotational angle of the rotating table can be obtained from the distance and relative displacements obtained. The above interferometer is hereinafter referred to as a calibration interferometer.

The inclination angle $\phi$ of the individual plane surfaces 13a and 13b of the reflecting mirror 13 of the interferometer according to the invention was set 7.5°, and the distance between the points $P_1$ and $P_4$ and the distance between the points $P_1$ and $P_2$ were set to 21.14 mm. The micrometer 22 was operated to cause rotation of the rotating table intermittently in 10 steps each of about 0.2". Using the interferometer according to the invention and the calibration interferometer, the displacement was measured and converted into the corresponding rotational angle.

Figure 8A:
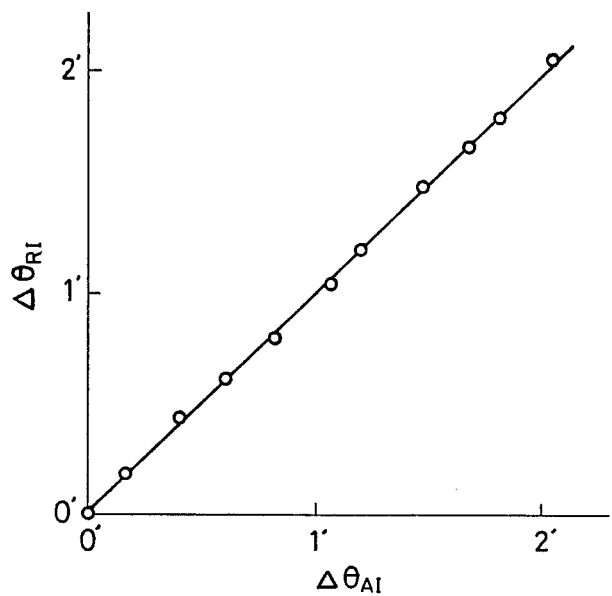
FIG. 8(a) is a graph showing measurements obtained by the interferometer according to the invention and a calibration interferometer when a rotating table is rotated by 0.2"

The graph of FIG. 8(a) shows the results. In the graph, the ordinate is scaled for the angle ($\Delta\theta_{R1}$) based on the measurement obtained by the interferometer according to the invention, and the abscissa is scaled for the angle ($\Delta\theta_{AI}$) based on the measurement obtained by the calibration interferometer. When both the measurement values coincide, the corresponding point is on a straight line at an angle of 45°. From the graph, it will be seen that the measurement values obtained according to the invention are substantially positioned on the 45° straight line.

Figure 8B:
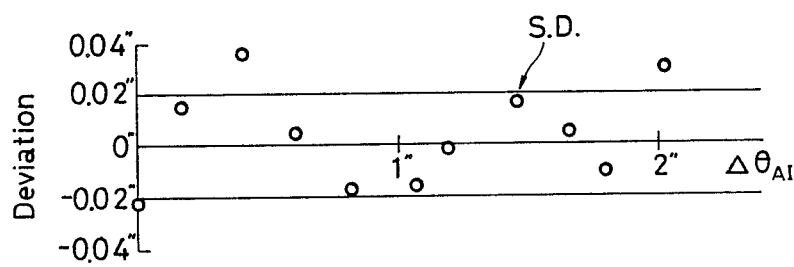
FIG. 8(b) is a graph showing the difference, to an enlarged scale, between the measurement obtained with the calibration interferometer and the measurement obtained with the interferometer according to the invention.

FIG. 8(b) shows the difference between the two measurement values to an enlarged scale for more detailed detection. In the graph, the abscissa is scaled for measurements obtained with a reference interferometer, and the ordinate is scaled for the difference of the angle ($\Delta\theta_{AI}$) measured with the reference interferometer from the angle ($\Delta\theta_{RI}$) measured with the interferometer according to the invention. Denoted by the S.D. is the standard deviation. It will be seen that the two values coincide in a range of ±0.02".

Figure 9:
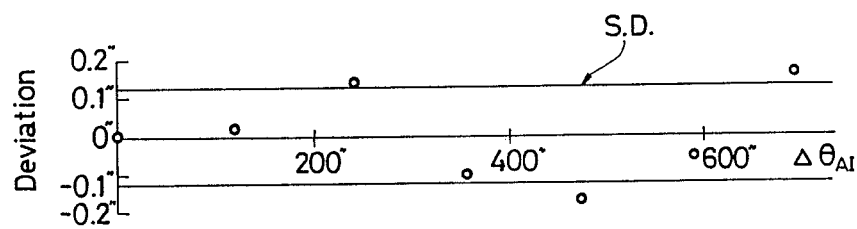
FIG. 9 is a graph showing the difference, to an enlarged scale, between the measurement of the calibration interferometer and the measurement of the interferometer according to the invention when a rotating table is rotated by 600" (10').

FIG. 9 shows the difference between the angles measured by the interferometer according to the invention and the calibration interferometer when the rotating table is rotated by about 2' for each. In the Figure, both the ordinate and abscissa are the same as for those in FIG. 8(b). It will be seen that the two values coincide in a range of 0.1" even in as large measurement range as 10'.

As has been described in the foregoing, according to the invention a double-path interferometer, a single biprism or a plurality of biprisms and a plane surface mirror or a plane surface mirror having two inclined plane surfaces are combined to provide a double-path arrangement such that in the positional and dimensional changes and motion of an object the translational component in the direction of motion and rotational components with respect to the three axes can be measured perfectly separately from one another from the direction of motion, so that it is possible to improve the accuracy of measurement.

Further, where a reflecting mirror having two central inclined plane surfaces and opposite end plane surfaces is used, since the body portion of the interferometer is common, it is possible to obtain neasurement of six freedom of degrees leading six respective light beams in a shifted relation to one another such that they will not interfere with one another. In this case, the six freedoms can be measured without obstruction of any of these measurements by others.

Obviously, many variations and modifications of the present invention can be made in light of the above teachings. It is therefore to be understood that within the scope of the appended claims, the present invention may be practiced otherwise than as specifically described herein.

What is claimed is:
1. An interferometer comprising:
(a) a first polarized beam splitter disposed on a light path from a light source for splitting an incident light beam into a transmitted light beam and a light beam reflected by 90 degrees relative to said transmitted light beam;
(b) a half-wave plate disposed on a light path of said first polarized beam splitter for rotating a polarization plane in said transmitted light beam by 90 degrees;
(c) a second polarized beam splitter disposed on a light path of said half-wave plate for reflecting by 90 degrees the transmitted light beam having its polarization plane rotated by 90 degrees;
(d) reflecting means disposed on a position in a direction at right angles relative to the light paths of said first and second polarized beam splitters for reflecting the respective reflected light beams from said first and second polarized beam splitters, said reflecting means consisting of a light path conversion means for modifying the light beam paths and transmitting said light beams therethrough to a reflecting mirror wherein said light beams are reflected back to said path conversion means;
(e) a quarter-wave plate interposed between said first and second polarized beam splitters and said reflecting means for rotating polarization planes in the transmitted light beams from said first and second polarized beam splitters by 90 degrees; and
(f) a cube corner prism disposed on the light path of said reflecting means on a side of said first and second polarized beam splitters opposite the side thereof on which said quarter-wave plate is disposed for inverting the direction of progress of the transmitted light beam from said first polarized beam splitter by 180 degrees to lead it to said second polarized beam splitter and also inverting the direction of progress of the transmitted light beam from said second polarized beam splitter by 180 degrees to lead it to said first polarized beam splitter.

2. The interferometer according to claim 1, wherein said light path conversion element is a biprism.

3. The interferometer according to claim 1, wherein said reflecting mirror is a plane surface mirror.

4. The interferometer according to claim 1, wherein said reflecting mirror has two plane reflection surfaces facing each other and having an equal inclination angle.

5. An interferometer comprising:

(a) a first polarized beam splitter disposed on a light path from a light source for splitting an incident light beam into a transmitted light beam and a light beam reflected by 90 degrees relative to said transmitted light beam;

(b) a half-wave plate disposed on a light path of said first polarized beam splitter for rotating a polarization plane in said transmitted light beam by 90 degrees;

(c) a second polarized beam splitter disposed on a light path of said half-wave plate for reflecting by 90 degrees the transmitted light beam having its polarization plane rotated by 90 degrees;

(d) a biprism disposed on a position in a direction at right angles relative to the light paths of said first and second polarized beam splitters for converting the respective reflected light paths of said first and second polarized beam splitters;

(e) a reflecting mirror having two plane reflection surfaces facing each other and having an equal inclination angle for reflecting the light beams passing through the light paths converted by said biprism back through said biprism;

(f) a quarter-wave plate interposed between said first and second polarized beam splitters and said biprism for rotating polarization planes in the transmitted light beams from said first and second polarized beam splitters; and (g) a cube corner prism disposed on said first and second polarized beam splitters for inverting the direction of progress of the transmitted light beam from said first polarized beam splitter by 180 degrees to lead it to said second polarized beam splitter and also inverting the direction of progress of the transmitted light beam from said second polarized beam splitter by 180 degrees to lead it to said first polarized beam splitter.

6. An interferometer comprising:

(a) a first polarized beam splitter disposed on a light path from a light source for splitting an incident light beam into a transmitted light beam and a light beam reflected by 90 degrees relative to said transmitted light beam;

(b) a half-wave plate disposed on a light path of said first polarized beam splitter for rotating a polarization plane in said transmitted light beam by 90 degrees;

(c) a second polarized beam splitter disposed on a light path of said half-wave plate for reflecting by 90 degrees the transmitted light beam having its polarization plane rotated by 90 degrees;

(d) a pair of biprisms disposed below said second polarized beam splitter at right angles relative to the light path of said second polarized beam splitter for converting the light path of the transmitted light beam from said second polarized beam splitter;

(e) a plane surface reflecting mirror disposed below said pair of biprisms for reflecting the light beam passing through the light path converted by said pair of biprisms and the light beam from said first polarized beam splitter back through said pair of biprisms;

(f) a quarter-wave plate interposed between said first and second polarized beam splitters and said pair of biprisms for rotating polarization planes in the transmitted light beams from said first and second polarized beam splitters by 90 degrees; and (g) a cube corner prism disposed on said first and second polarized beam splitters for inverting the direction of progress of the transmitted light beam from said first polarized beam splitter by 180 degrees to lead it to said second polarized beam splitter and also inverting the direction of progress of the transmitted light beam from said second polarized beam splitter by 180 degrees to lead it to said first polarized beam splitter.

* * * * *